(12) United States Patent
Lin

(10) Patent No.: US 8,047,300 B1
(45) Date of Patent: Nov. 1, 2011

(54) CULTIVATOR

(76) Inventor: Huang-Lung Lin, Puyan Township, Changhua County (TW)

(\*) Notice: Subject to any disclaimer, the term of this patent is extended or adjusted under 35 U.S.C. 154(b) by 0 days.

(21) Appl. No.: 12/850,790

(22) Filed: Aug. 5, 2010

(51) Int. Cl.
*A01B 39/00* (2006.01)
*A01B 1/16* (2006.01)

(52) U.S. Cl. ............................... 172/349; 172/378

(58) Field of Classification Search ............... 172/349, 172/350, 371–378, 15, 21, 49, 156, 157, 172/368, 329, 540–548, 575; 30/173, 205, 30/231, 240, 265, 302, 306, 307, 346.59, 30/346.6; 111/140; 7/114, 115, 116; 294/49–50.8, 294/51, 55.5, 61
See application file for complete search history.

(56) References Cited

U.S. PATENT DOCUMENTS

| | | | |
|---|---|---|---|
| 39,389 A * | 8/1863 | Ernst | 172/153 |
| 1,100,115 A * | 6/1914 | Braasch | 172/381 |
| 1,156,714 A * | 10/1915 | Schroeder et al. | 172/373 |
| 4,336,845 A * | 6/1982 | Kolb | 172/349 |
| 4,678,043 A * | 7/1987 | vom Braucke et al. | 172/349 |
| 5,207,466 A * | 5/1993 | Ohlson | 294/61 |
| 5,609,215 A * | 3/1997 | Rios et al. | 172/373 |
| 6,694,717 B1 * | 2/2004 | Dedrick | 56/400.04 |
| 7,735,573 B2 * | 6/2010 | Catalano | 172/349 |

\* cited by examiner

*Primary Examiner* — Robert Pezzuto
(74) *Attorney, Agent, or Firm* — Ming Chow; Sinorica, LLC

(57) ABSTRACT

A cultivator includes an operation rod and at least one fixing seat. The operation rod includes a predetermined number of detachable rotary wheels at a predetermined position. The fixing seat is pivotally connected to the operation rod. A predetermined number of cultivating claws are pivoted on a circumferential portion of the fixing seat at a predetermined angle and position after being assembled. Through the rotary wheels or the cultivating claws, the cultivator is turned left and right or back and forth to loosen soil.

9 Claims, 9 Drawing Sheets

CULTIVATOR

BACKGROUND OF THE INVENTION

1. Field of the Invention

The present invention relates to a cultivator.

2. Description of the Prior Art

A conventional gardening tool, such as a cultivator, a shovel, a digger or the like, provides a different function and use. Each tool has a specific use to provide a different effect.

However, each conventional gardening tool only provides a single effect. If the user needs to use different tools, he/she has to purchase various tools and to change the tools frequently. It is very inconvenient and ineffective to carry so many tools at a time.

SUMMARY OF THE INVENTION

The present invention is to provide a cultivator. The cultivator includes an operation rod and at least one fixing seat. The operation rod includes a predetermined number of detachable rotary wheels at a predetermined position. The fixing seat is pivotally connected to the operation rod. A predetermined number of cultivating claws are pivoted on a circumferential portion of the fixing seat at a predetermined angle and position after being assembled.

Through the change of the rotary wheels or the cultivating claws, the cultivating claws of the cultivator are first turned to loosen the soil partially, and then the rotary wheels are used to loosen the soil linearly. The present invention provides different effects to loosen the soil with a single device.

DETAILED DESCRIPTION OF THE PREFERRED EMBODIMENTS

Embodiments of the present invention will now be described, by way of example only, with reference to the accompanying drawings.

Figure 1:
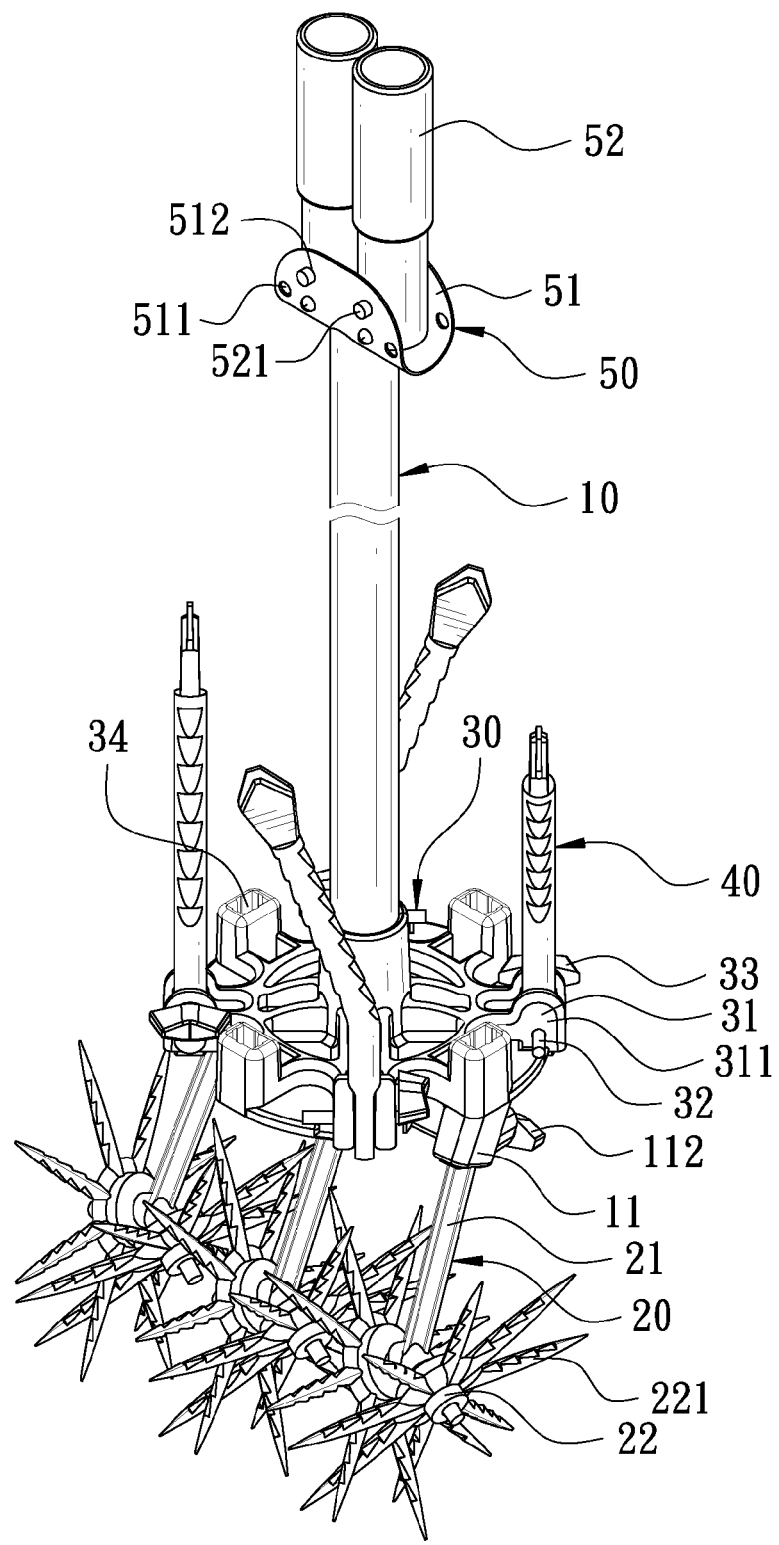
FIG. 1 is a perspective view according to a preferred embodiment of the present invention.
Figure 2:
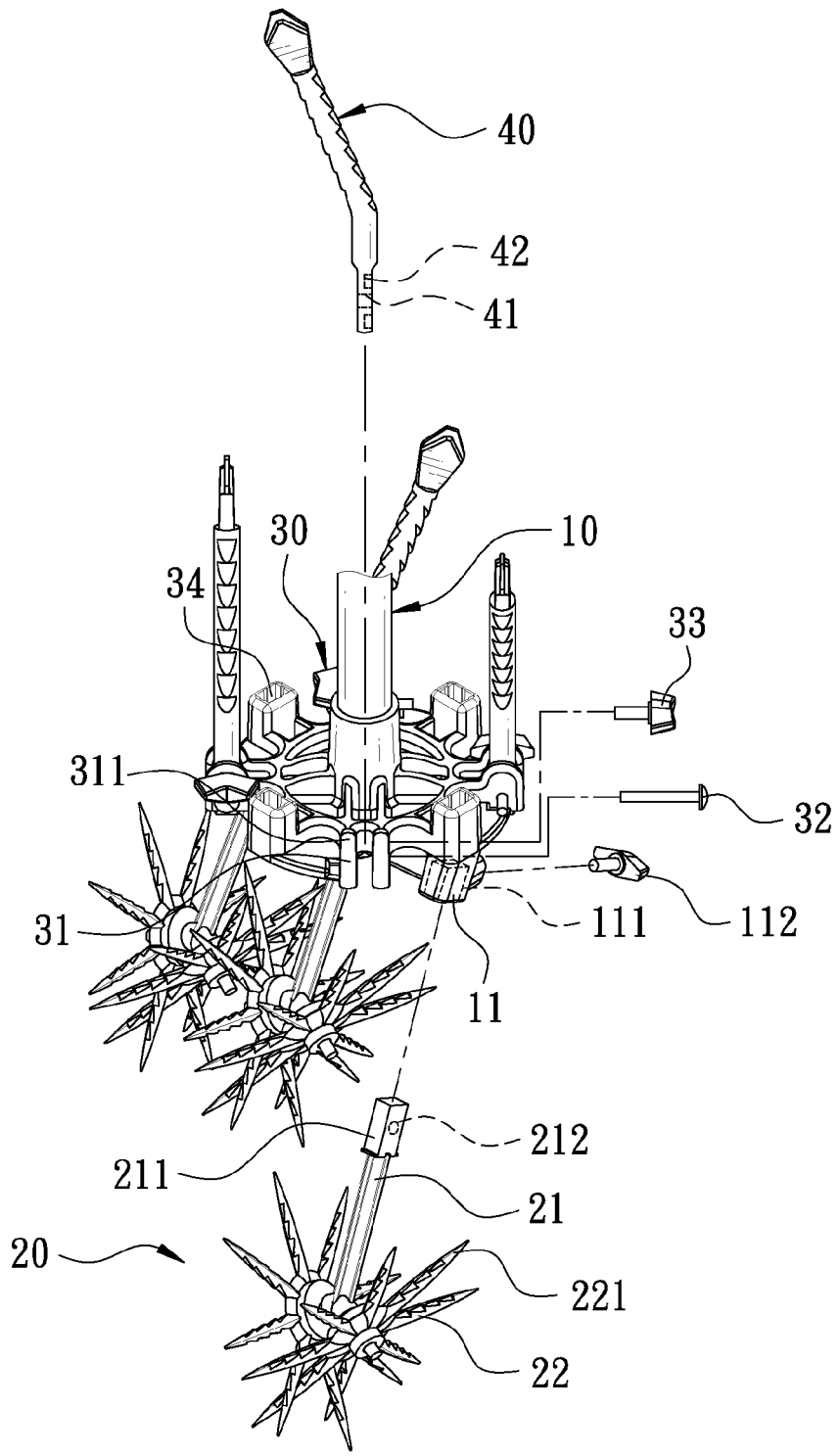
FIG. 2 is a partially exploded view according to the preferred embodiment of the present invention.

As shown in FIG. 1 and FIG. 2, a cultivator according to a preferred embodiment of the present invention comprises an operation rod 10, a fixing seat 30, and a top seat 50.

The operation rod 10 is provided with three sockets 11 at one end thereof. Each of the sockets 11 has an insertion hole 111. One side of the socket 11 is provided with a positioning member 112 which is a screw in this embodiment. Each socket 11 is connected with a rotary wheel 20. The rotary wheel 20 has a shaft 21. The shaft 21 has a coupling portion 211 at one end thereof to be secured in the insertion hole 111. The coupling portion 211 has a coupling hole 212 corresponding to the positioning member 112. Another end of the shaft 21 is pivotally connected with two rollers 22 opposite to the coupling portion 211. Each of the rollers 22 has radial insertion rods 221 thereon. The rollers 22 are obliquely pivoted to the shaft 21 to be interlaced with each other.

The fixing seat 30 is connected to the operation rod 10, which can be integrally connected with the sockets 11 or be separately provided. The fixing seat 30 comprises four holders 31 on a circumferential portion of the fixing seat 30. Each of the holders 31 is composed of two spaced positioning boards 311. Each of the holders 31 is connected with a cultivating claw 40. The cultivating claw 40 has a pin hole 41 for insertion of a pin 32, so that the cultivating claw 40 is pivotally connected to the holder 31 with the pin 32 as a pivot. The holder 31 is provided with a positioning member 33 beside the pin 32. In this embodiment, the positioning member 33 is a screw. The cultivating claw 40 has a positioning hole 42 beside the pin hole 41. The positioning hole 42 is located corresponding to the positioning member 33.

The top seat 50 is connected to another end of the operation rod 10 opposite to the sockets 11. The top seat 50 has a top board 51 at two sides thereof, and two operation handles 52 are pivotally connected on the top seat 50. The top board 51 has a horizontal positioning hole 511 and a vertical positioning hole 512 corresponding to each of the operation handles 52. A positioning block 521 is provided in each of the operation handles 52. The positioning block 521 can be confined in the horizontal positioning hole 511 or the vertical positioning hole 512 to change the operation handles 52 at a horizontal or vertical position.

In order to understand the feature, the technical means and the expected effects of the present invention, the following description is to describe the use of the present invention.

Figure 3:
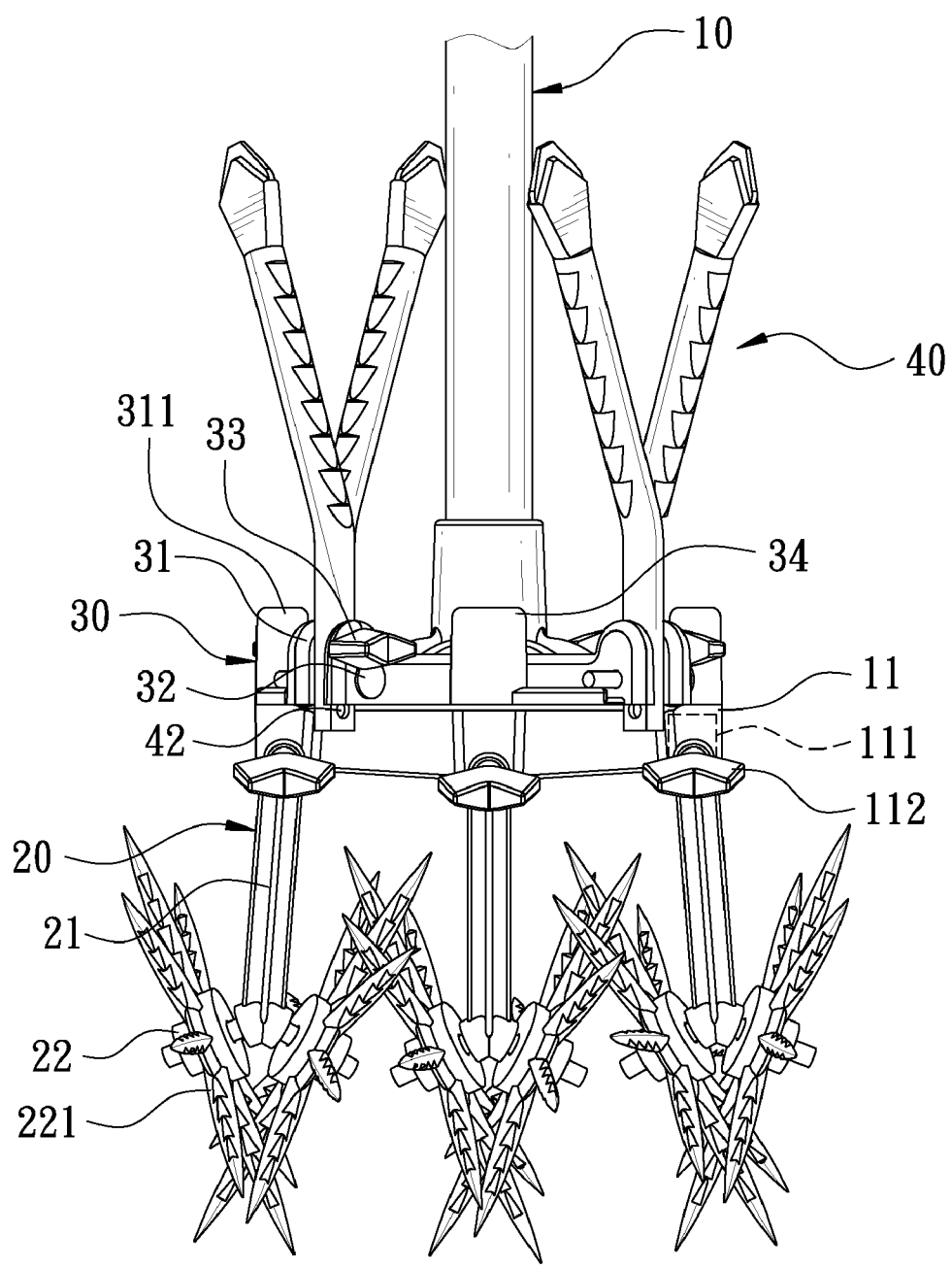
FIG. 3 is a schematic view to show rotary wheels when in use according to the preferred embodiment of the present invention.
Figure 4:
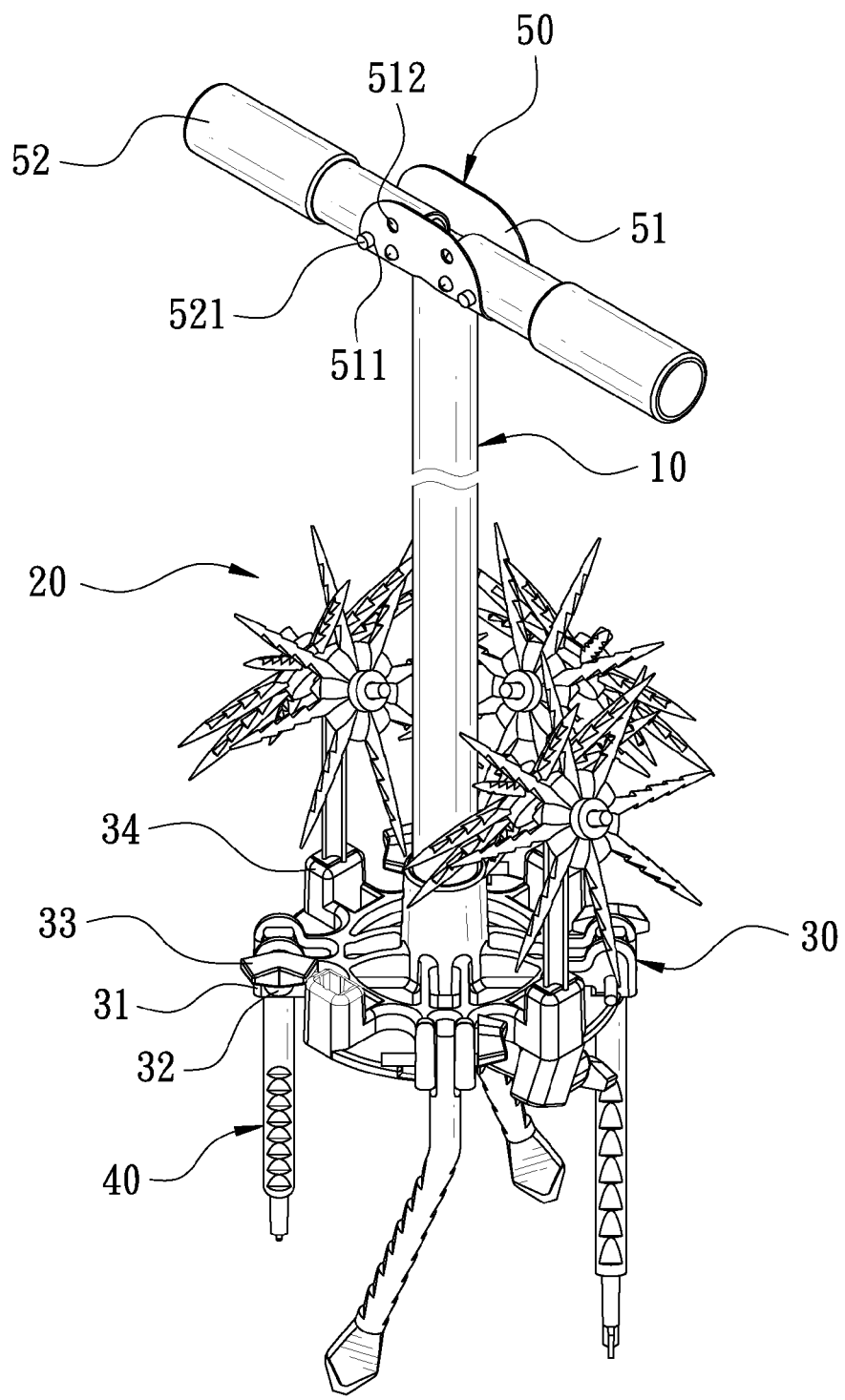
FIG. 4 is a schematic view to show cultivating claws when in use according to the preferred embodiment of the present invention.
Figure 5:
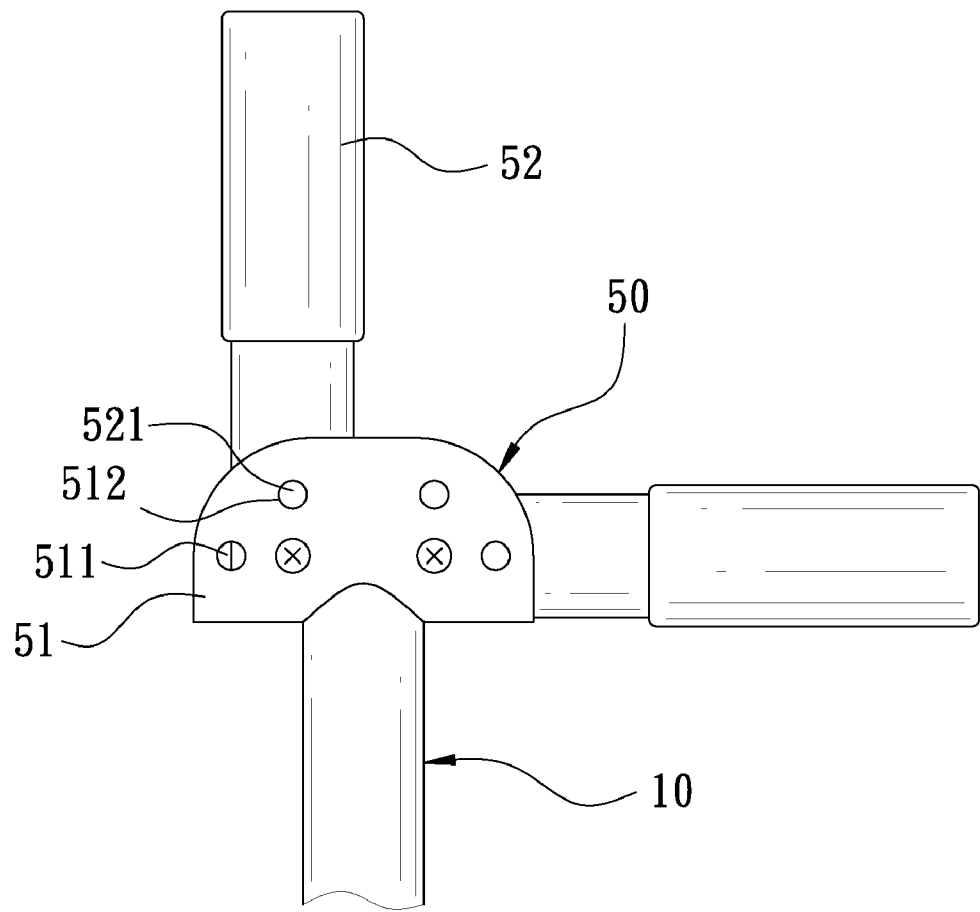
FIG. 5 is a schematic view to show the operation of operation handles according to the preferred embodiment of the present invention.

Referring to FIG. 3, when the rotary wheels 20 are in use, the cultivating claws 40 are turned toward the operation rod 10. Each rotary wheel 20 is coupled to a corresponding socket 11, such that the rotary wheel 20 can be used to loosen the soil. FIG. 4 is to show the cultivating claws 40 when in use. First, the positioning member 112 is unscrewed to disengage the rotary wheel 20 from the insertion hole 111, and then the positioning member 33 is unscrewed to disengage from the positioning hole 42, such that the cultivating claw 40 is rotatable with respect to the holder 31. The cultivating claw 40 is turned downward to be away from the operation rod 10, and then the positioning member 33 is screwed to engage with the positioning hole 42 of the cultivating claw 40 to secure the cultivating claw 40 for use. The released rotary wheels 20 can be received in accommodating troughs 34 disposed on the fixing seat 30. Referring to FIG. 5, when the rotary wheels 20 are used, the operation handles 52 are arranged vertically. When the cultivating claws 40 are used, the operation handles 52 are arranged perpendicularly. The position of the operation handles 52 can be changed in accordance with different applied force ways.

Figure 6:
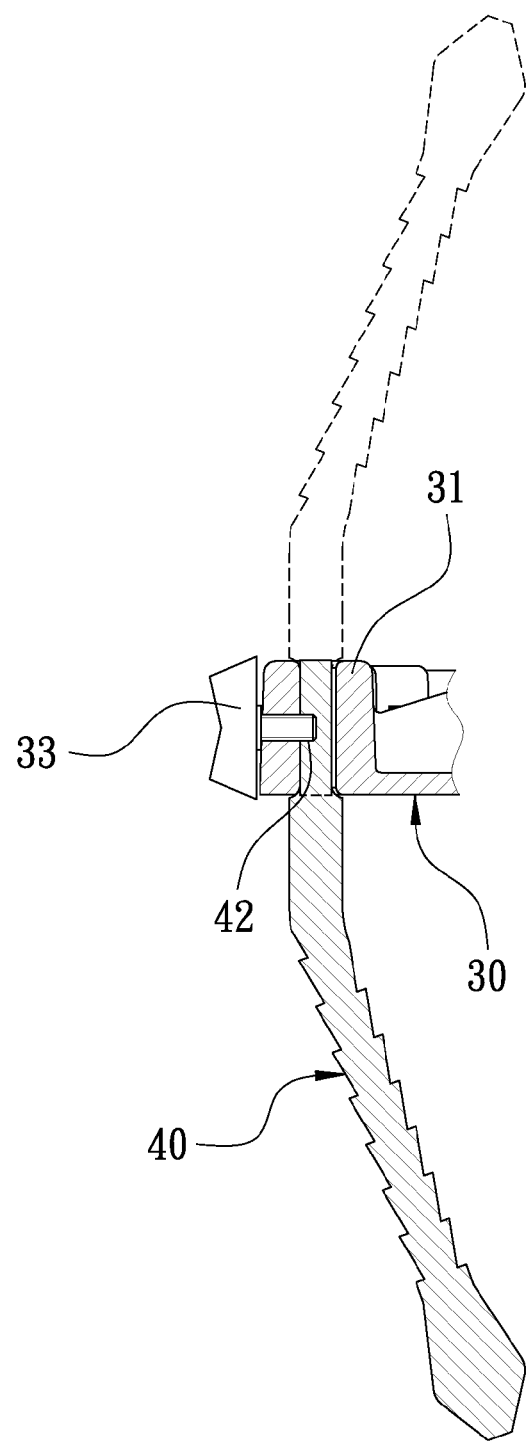
FIG. 6 is a schematic view to show the connection of the cultivating claw according to the preferred embodiment of the present invention.

Referring to FIG. 6, the cultivating claw 40 can be placed upward or downward on the holder 31. When the cultivating claw 40 is in use, the cultivating claw 40 is turned downward to be located under the holder 31 with the positioning hole 42 engaging with the positioning member 33. When the cultivating claw 40 is not in use, the cultivating claw 40 is turned upward to be secured on the holder 31.

Figure 7:
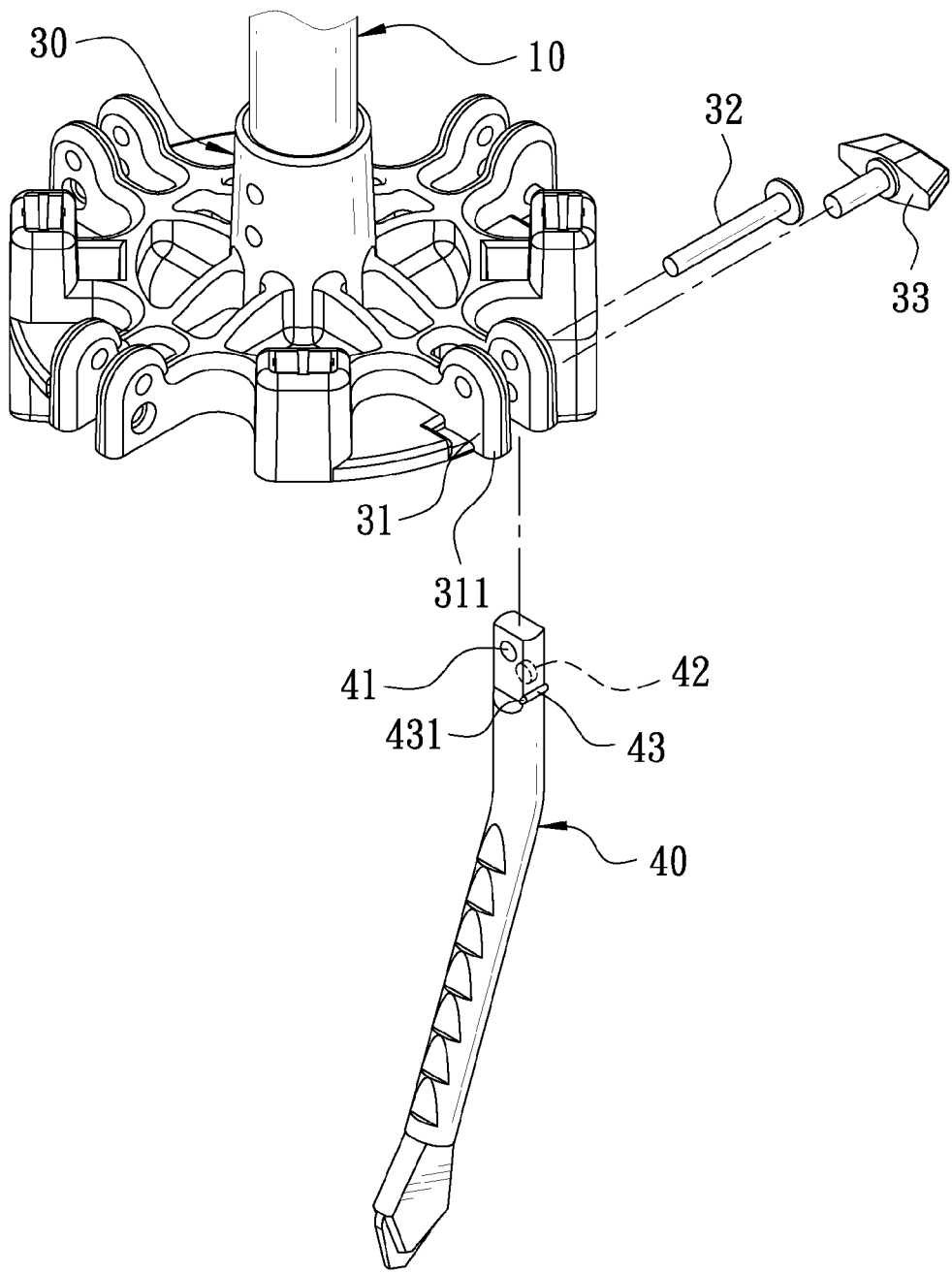
FIG. 7 is a perspective view showing another embodiment of the cultivating claw.
Figure 8:
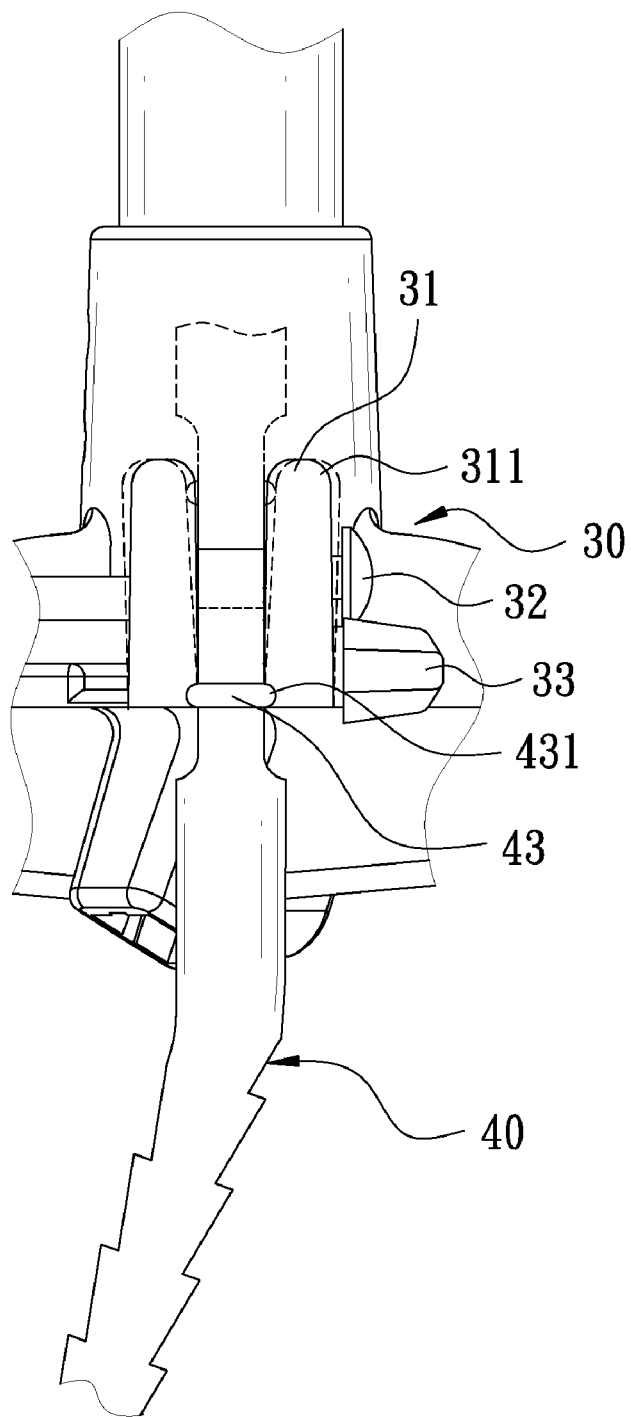
FIG. 8 is a side view of FIG. 7.
Figure 9:
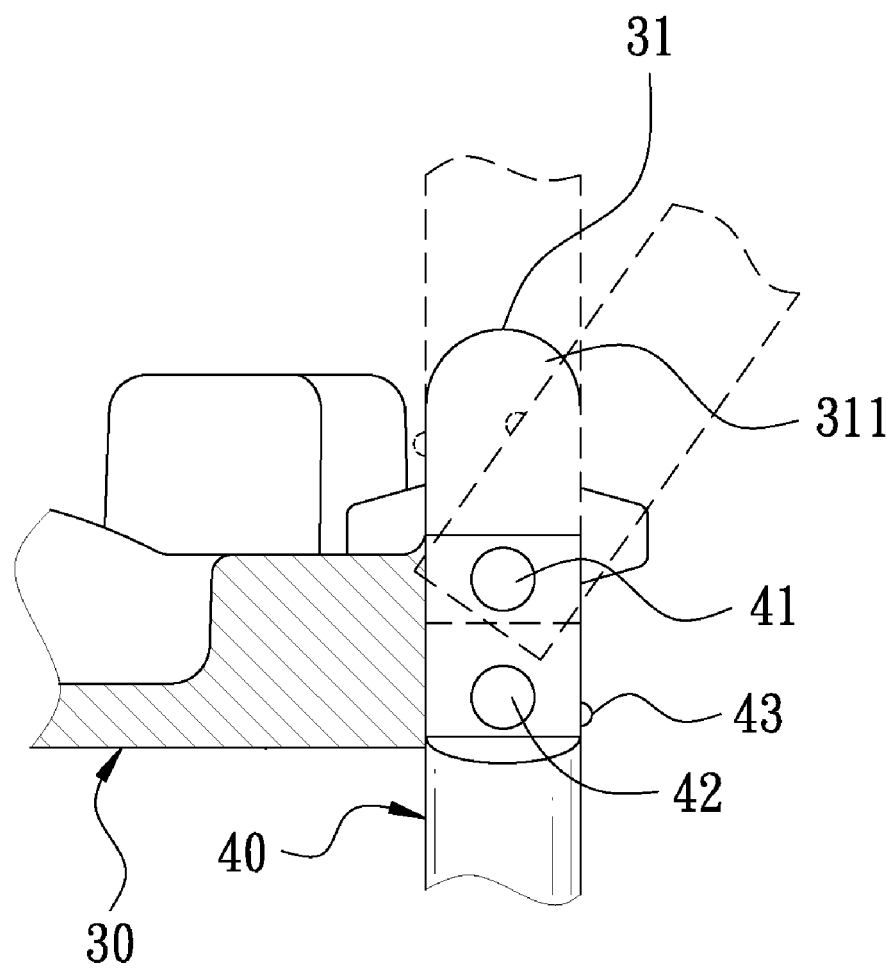
FIG. 9 is a schematic view of FIG. 7 when in use.

FIG. 7, FIG. 8 and FIG. 9 show another embodiment of the cultivating claw 40. One side of the cultivating claw 40 is provided with a protruding block 43. The protruding block 43 has two protrusions 431 at two sides thereof. When the cultivating claw 40 is coupled to the holder 31, the protruding block 43 is located out of the locating boards 311. The width of the protruding block 43 is slightly larger than the gap defined between the positioning boards 311, so that the protrusions 431 are protruded out of the gap between the positioning boards 311. The positioning hole 42 of the cultivating claw 40 is engaged with the positioning member 33 when the cultivating claw 40 is in use. When the cultivating claw 40 is not in use, the positioning member 33 is unscrewed to turn the cultivating claw 40 upward. Referring to FIG. 8, the protrusions 431 have a width larger than the gap between the positioning boards 311 to slightly expand the positioning boards 311. After the protruding block 43 passes over the positioning boards 311, the positioning boards 311 will be restored to its original position. The protrusions 431 of the protruding block 43 are confined again by the positioning boards 311 to secure the cultivating claw 40 toward the operation rod 10.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A cultivator, comprising:
    an operation rod comprising a predetermined number of detachable rotary wheels at a predetermined position;
    at least one fixing seat being pivotally connected to the operation rod;
    a predetermined number of cultivating claws pivoted on a circumferential portion of the fixing seat at a predetermined angle and position after being assembled;
    the at least one fixing seat comprises a plurality of holders disposed on a circumferential portion of the fixing seat;
    the at least one fixing seat is fixed to one end of the operation rod;
    a predetermined number of sockets being provided under the fixing seat;
    each of the rotary wheels having a shaft;
    the shaft having a coupling portion at one end thereof to connect with a corresponding socket, and another end of the shaft being pivotally connected with at least one roller opposite to the coupling portion;
    the at least one roller having radial insertion rods thereon;
    the cultivating claws being pivotally connected to the holders;
    each of the holders being provided with a positioning member to secure the cultivating claws; and
    thereby, through the rotary wheels or the cultivating claws, the cultivator being turned left and right or back and forth to loosen soil.

2. The cultivator as claimed in claim 1, wherein each of the sockets has an insertion hole to connect with the coupling portion.

3. The cultivator as claimed in claim 1, wherein each of the cultivating claws has a positioning hole at a predetermined position corresponding to the positioning member.

4. The cultivator as claimed in claim 1, wherein each of the cultivating claws has a pin hole for insertion of a pin, the cultivating claws being pivotally connected to the holders, each of the holders being provided with a positioning member beside the pin, each of the cultivating claws having a positioning hole beside the pin hole.

5. The cultivator as claimed in claim 4, wherein each of the holders is composed of two spaced positioning boards, the positioning member being disposed on one of the positioning boards.

6. The cultivator as claimed in claim 5, wherein each of the cultivating claws has one side provided with a protruding block, the protruding block having a protrusion at least one side thereof, the protruding block having a width slightly larger than a gap defined between the positioning boards.

7. The cultivator as claimed in claim 1, wherein one end of the operation rod is provided with at least one operation handle, the operation handle being changeable to be vertical or horizontal relative to the operation rod.

8. The cultivator as claimed in claim 7, wherein the end of the operation rod is provided with a top seat, the top seat having a top board at two sides thereof, two operation handles being pivotally connected on the top seat, the top board having a horizontal positioning hole and a vertical positioning hole corresponding to each of the operation handles, a positioning block being provided in each of the operation handles, the positioning block being confined in the horizontal positioning hole or the vertical positioning hole to change the operation handles at a horizontal or vertical position.

9. The cultivator as claimed in claim 1, wherein the fixing seat has a predetermined number of accommodating troughs at a predetermined position to receive the cultivating claws.

* * * * *